TABLET WITH CONTRASTING INDICIA AND METHOD

Filed Aug. 9, 1961 2 Sheets-Sheet 1

INVENTOR
EMANUEL B. HERSHBERG

BY Stowell & Stowell

ATTORNEYS

TABLET WITH CONTRASTING INDICIA AND METHOD

Filed Aug. 9, 1961 2 Sheets-Sheet 2

INVENTOR
EMANUEL B. HERSHBERG

BY Stowell & Stowell

ATTORNEYS

United States Patent Office 3,125,490
Patented Mar. 17, 1964

3,125,490
TABLET WITH CONTRASTING INDICIA AND METHOD

Emanuel B. Hershberg, West Orange, N.J., assignor to Schering Corporation, Bloomfield, N.J., a corporation of New Jersey
Filed Aug. 9, 1961, Ser. No. 130,346
6 Claims. (Cl. 167—82)

This invention relates to pharmaceutical tablets containing visually contrasting indicia on the surfaces thereof. More particularly the invention relates to a method of forming a pharmaceutical tablet with impressed indicia on the surfaces thereof and subsequently applying a contrasting color to the surface of the tablet.

The pharmaceutical industry has used various means to prevent counterfeiting of its products among which are resorts to various shapes and identifying marks. A desideratum of the industry is to be able to produce efficiently and economically pharmaceutical tablets which are difficult to counterfeit and which contain clearly identifiable characteristics and indicia of each manufacturer's tablets.

The present invention provides a novel method of producing pharmaceutical tablets which contain impressed indicia and contrasting colors on the surfaces thereof.

The method of the invention comprises an initial step which involves the forming of the pharmaceutical composition into a tablet of desired shape or configuration while at the same time forming an indicia on one or more surfaces of the formed tablet. Thereafter, a contrasting color composition is applied either on the indicia itself or on the surface area surrounding the indicia whereby a visually contrasting indicia is provided on at least one surface of the tablet.

The forming of the pharmaceutical composition into the desired tablet form containing the impressed indicia on the surfaces may be performed in any known suitable manner, such as by compression of the composition between suitable dies, molding, rolling, stamping, etc. The formed tablet will contain the indicia on the surface or surfaces of the tablet. The indicia of a suitable design may be present in embossed or intaglio form on one or more surfaces of the formed tablet. Thus, tablets may be formed with indicia on merely one surface. The tablets may also be formed with identical or differing designs on both sides of the tablet. In addition, the surfaces of the tablets may be flat, curved, or any suitable desired configuration.

After the formation of the tablet, the contrasting color is applied to the surface or surfaces containing the indicia in any suitable manner. The application of a suitable edible color composition to the tablet surfaces is most suitably accomplished by the use of well known apparatuses which are capable of printing on tablet surfaces. A suitable means for accomplishing the result will be described hereinafter. The color composition is applied on the surfaces of the tablet either on the indicia if it is present in embossed form or on the surfaces aside from the indicia if it is in intaglio form. In this manner, the original color of the tablet will contrast with the applied color and the indicia will become very prominent and conspicuous.

Furthermore, it is possible and contemplated within the scope of this invention that a combination of an embossed and an intaglio design be formed on a surface and different colors be applied thereto. Such a multicolor indicia may be obtained by a two-step color application procedure wherein the several colors are applied in separate application steps.

The foregoing and other objects, advantages and characterizing features of the invention will become clearly apparent from the following detailed description together with the accompanying drawing forming a part thereof wherein.

Figure 1:
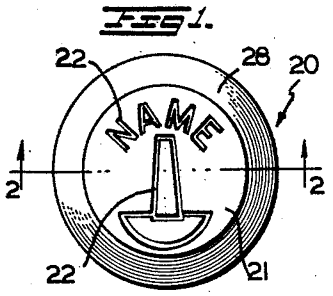
FIGURE 1 is a top plan view of one embodiment of a pharmaceutical tablet in accordance with this invention.
Figure 2:
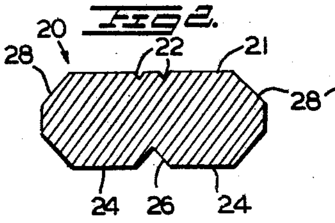
FIGURE 2 is a transverse sectional view taken along line 2—2 of FIGURE 1.
Figure 3:
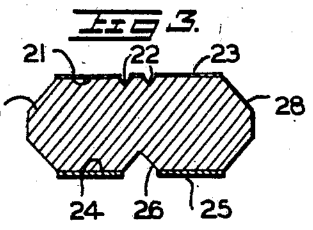
FIGURE 3 is also a transverse sectional view taken along line 2—2 of FIGURE 1 and showing in addition the printed layers.
Figure 4:
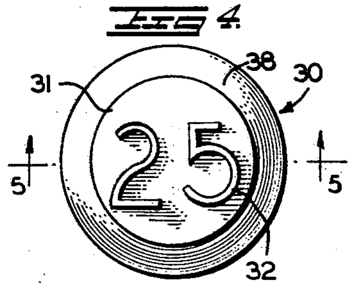
FIGURE 4 is a top plan view of another embodiment of a pharmaceutical tablet in accordance with this invention.
Figure 5:
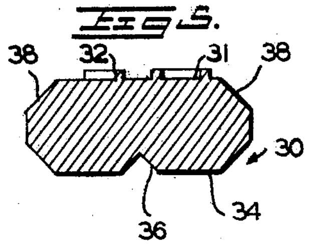
FIGURE 5 is a transverse sectional view taken along line 5—5 of FIGURE 4.
Figure 8:
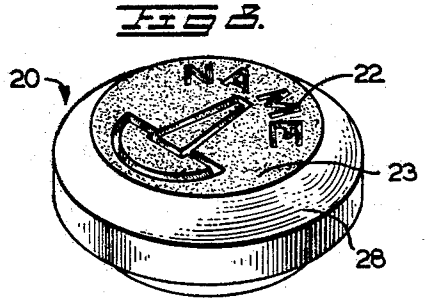
FIGURE 8 is a perspective view of the tablet shown in FIGURES 1–3.

Referring now to FIGURES 1–3 and 8 of the drawings, there is shown a tablet 20 which has been formed, for example, by compressing a pharmaceutical composition. An intaglio indicia 22 has been formed on surface 21 during the formation of the tablet. The tablet also has beveled sides 28 and a V-notch 26 on the opposite surface 24. FIGURES 2 and 8 show the areas of surfaces 21 and 24 to which contrasting colored ink layers 23 and 25 have been applied.

Figure 6:
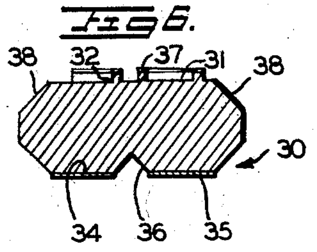
FIG. 6 is a transverse sectional view taken along line 5—5 of FIGURE 4 and showing in addition the printed layers.
Figure 9:
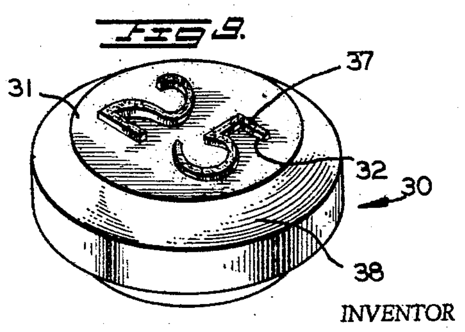
FIGURE 9 is a perspective view of the tablet shown in FIGURES 4–6.

FIGURES 4–6 and 9 show another tablet 30 which has been formed, for example, by compressing a pharmaceutical composition. An embossed indicia 32 has been formed on surface 31 during the formation of the tablet. The tablet also has beveled sides 38 and a V-notch 36 on the opposite surface 34. FIGURES 6 and 9 show a contrasting colored ink layer 37 which has been applied to the embossed indicia 32. A contrasting colored ink layer 35 has also been applied to surface 34.

Figure 7:
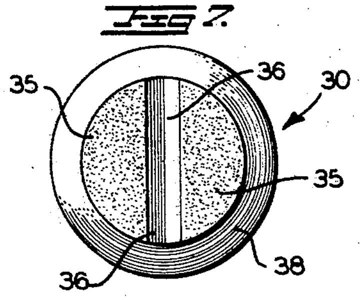
FIGURE 7 is a bottom plan view of the tablet shown in FIGURE 6.

FIGURE 7 shows a tablet 30 disclosing the opposite or underneath surface of the tablet shown in FIGURE 6. A contrasting colored ink layer 35 has been applied to surface 34. The showing in FIGURE 7 of the opposite surface of tablet 30 is the same as the opposite or underneath surface of tablet 20.

Figure 10:
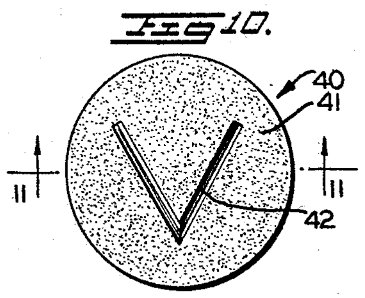
FIGURE 10 is a top plan view of another embodiment of a pharmaceutical tablet in accordance with the invention.
Figure 11:
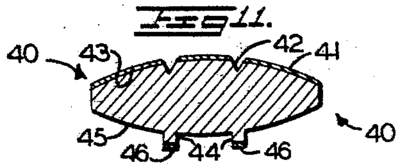
FIGURE 11 is a transverse sectional view taken along line 11—11 of FIGURE 10.

FIGURES 10 and 11 show another embodiment of the invention wherein a tablet 40 has been formed by compressing a pharmaceutical composition. The tablet has curved surfaces 43 and 45. An intaglio indicia 42 has been formed on surface 43 to which a contrasting colored ink layer 41 has been applied. An embossed indicia 44 has been formed on surface 45 and a contrasting colored ink layer 46 has been applied thereto. Colored ink layers 41 and 46 may be the same color or different colors.

Figure 12:
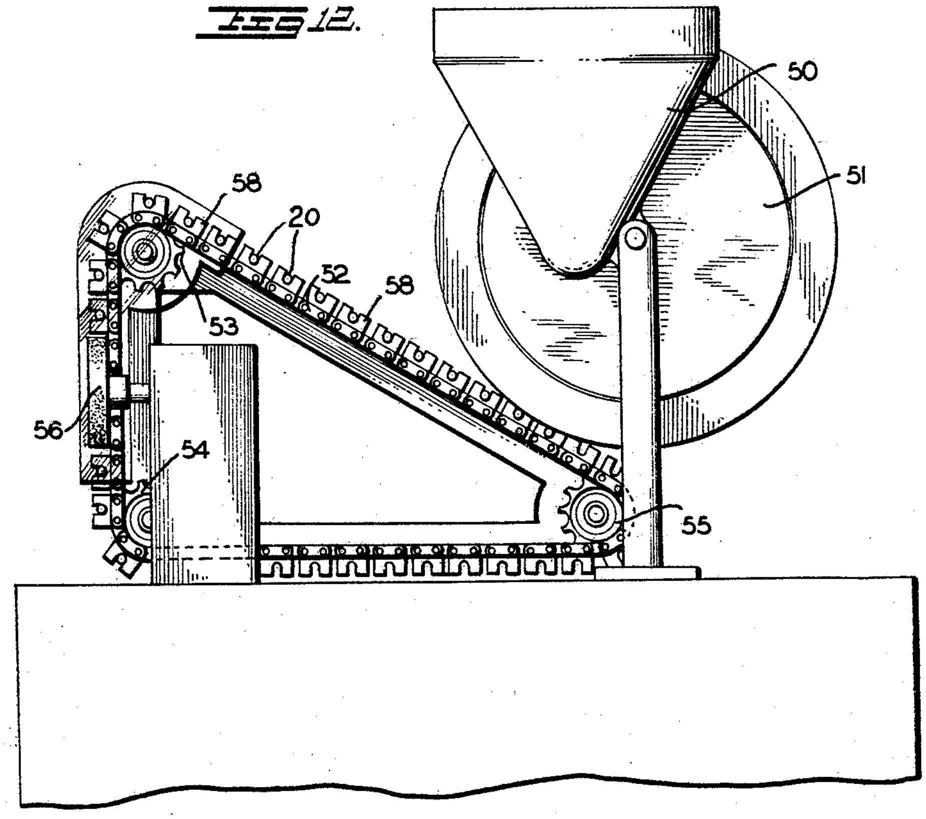
FIGURE 12 is a schematic side elevational view of an apparatus suitable for carrying out the method of the invention.
Figure 13:
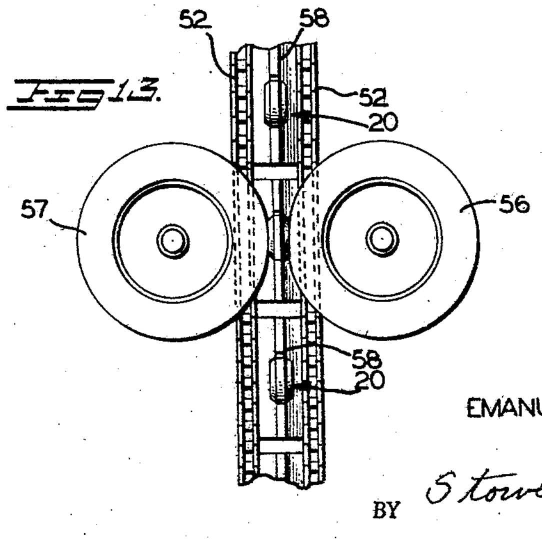
FIGURE 13 is an enlarged fragmentary end elevational view taken along line 13—13 of FIGURE 12.

FIGURES 12 and 13 show briefly in schematic outline an apparatus suitable for applying the colored ink layer to the surfaces of the tablets. The commercially available apparatus is used for printing indicia on tablets in a known manner. The apparatus comprises a hopper 50, tablet aligning wheel 51, a pair of endless chains 52, tablet carrying elements 58 disposed between the chains, sprocket elements 53, 54, and 55, and ink transfer rolls 56 and 57. Ordinarily the apparatus is used with steel engraved rolls (not shown) which are linked and the indicia is transferred therefrom to the rolls 56 and 57 which perform as offset rolls and transfer the indicia to the surfaces of the tablets. However, the apparatus as used in the instant invention does not require the use of the engraved rolls. The rolls 56 and 57 perform as ink transfer rolls. Ink is applied to them by any suitable means (not shown).

Hopper 50 is filled with tablets from which the tablets fall into wheel 51 which performs the functioning of aligning and positioning the tablets in the tablet carrying elements 58. The chains driven by suitable means (not shown) transport the tablets 20 in the carrying elements 58 between the rolls 56 and 57 and ink is thereby applied to each surface of the tablet. As stated heretofore, different colored inks may be applied to the respective surfaces. The rolls 56 and 57 may be varied in softness to conform to the curvature of the surfaces of the tablets.

The following are typical formulas for colored inks suitable for application to the surfaces of tablets in accordance with this invention. They are merely illustrative and it is to be understood that any suitable edible colored ink may be used. The confectioner's glaze used in the formulations consists of 8 pounds of bleached edible shellac in 1 gallon of 35A ethyl alcohol.

*Edible Blue Black Ink A8019*

| | Percent |
|---|---|
| 8 lb. cut confectioner's glaze in 35A ethyl alcohol | 60.0 |
| 6 lb. cut confectioner's glaze in N butyl alcohol | 30.0 |
| D and C Blue No. 6 K7024 (Kohnstamm) | 10.02 |

*Edible Brown Ink for Polished Tablets A8586*

| | Percent |
|---|---|
| 8 lb. cut confectioner's glaze in 35A ethyl alcohol | 72.000 |
| Propylene glycol, U.S.P. | 8.000 |
| Ammonia, U.S.P. | 7.998 |
| Cosmetic Red Oxide (Kohnstamm) | 11.000 |
| F.D.C. Red No. 3 | 1.000 |
| Confectionary Black A9115 (Kohnstamm) | 0.002 |

*Edible Maroon Ink*

| | Percent |
|---|---|
| 8 lb. cut confectioner's glaze in 35A alcohol | 62.000 |
| F.D.C. Violet No. 1 Lake | 7.000 |
| Cosmetic red oxide | 15.000 |
| Ammonia U.S.P. | 7.000 |
| Propylene glycol U.S.P. | 7.000 |
| Wetting agent | 2.000 |

By the uses of the method of this invention, it is possible to readily obtain an easily identifiable, prominent indicia on even a small tablet and avoid a blurred monotone which makes recognition difficult and counterfeiting easy.

What is claimed is:

1. A method of producing a pharmaceutical tablet containing a visually contrasting indicia on a surface thereof which comprises forming a pharmaceutical composition into tablet form having an impressed indicia thereon differing in relief from the surface of the tablet adjacent to said indicia, and thereafter applying to the surface of said tablet a color composition wherein the higher of said indicia and adjacent surface is provided with a visually contrasting color from the lower thereof.

2. The method of claim 1 wherein said application of said color composition is from a uniformly color-coated applying member.

3. A method of producing a pharmaceutical tablet containing a visually contrasting indicia on a surface thereof which comprises forming a pharmaceutical composition into tablet form having an impressed intaglio indicia thereon differing in relief from the surface of the tablet adjacent to said indicia, thereafter applying to the non-intaglio surface of said tablet a color composition whereby the higher of the indicia and the adjacent surface is provided with a visually contrasting color from the lower thereof.

4. A method of producing a pharmaceutical tablet containing a visually contrasting indicia on a surface thereof which comprises forming a pharmaceutical composition into tablet form having an impressed embossed indicia thereon differing in relief from the surface of the tablet adjacent to said indicia, and thereafter applying to the embossed surface of said tablet a color composition whereby the higher of said indicia and adjacent surface is provided with a visually contrasting color from the lower thereof.

5. A pharmaceutical tablet containing visually contrasting indicia on a surface thereof comprising a formed tabled containing an impressed intaglio indicia on a surface thereof differing in relief from the surface of the tablet adjacent to said impressed intaglio indicia and an applied contrasting color on the non-intaglio portion of said surface whereby the higher of said indicia and adjacent surface of the pharmaceutical tablet is provided with a visually contrasting color from the lower thereof.

6. A pharmaceutical tablet containing visually contrasting indicia on a surface thereof comprising a formed tablet containing an impressed embossed indicia on a surface thereof differing in relief from the surface of the tablet adjacent to said indicia and an applied contrasting color on the embossed areas of said surface whereby the higher of said indicia and adjacent surface is provided with a visually contrasting color from the lower thereof.

References Cited in the file of this patent

UNITED STATES PATENTS

| | | |
|---|---|---|
| 1,861,047 | Colton | May 31, 1932 |
| 2,687,367 | Burrin | Aug. 24, 1954 |
| 2,949,082 | McCarley | Aug. 16, 1960 |
| 2,996,431 | Barry | Aug. 15, 1961 |
| 3,044,938 | Halley | July 17, 1962 |
| 3,048,526 | Boswell | Aug. 7, 1962 |

OTHER REFERENCES

Physicians' Desk Reference, 15th edition, Medical Economics Inc., Oradell, N.J., Section Four, pp. V–XVI.